(12) United States Patent
Dirscherl (10) Patent No.: US 7,003,864 B2
(45) Date of Patent: Feb. 28, 2006

(54) METHOD FOR PRODUCING A PART AND DEVICE FOR CARRYING OUT THIS METHOD

(75) Inventor: Markus Dirscherl, Munich (DE)

(73) Assignee: Innovaris GmbH, Brunnthal Nord (DE)

( * ) Notice: Subject to any disclaimer, the term of this patent is extended or adjusted under 35 U.S.C. 154(b) by 0 days.

(21) Appl. No.: 10/432,723

(22) PCT Filed: Nov. 26, 2001

(86) PCT No.: PCT/EP01/13763

§ 371 (c)(1),
(2), (4) Date: Nov. 12, 2003

(87) PCT Pub. No.: WO02/42056

PCT Pub. Date: May 30, 2002

(65) Prior Publication Data

US 2004/0099983 A1 May 27, 2004

(30) Foreign Application Priority Data

Nov. 27, 2000 (DE) ................. 100 58 748

(51) Int. Cl.
*B29C 67/00* (2006.01)
*B22F 3/105* (2006.01)
(52) U.S. Cl. ............ 29/527.2; 29/527.1; 29/458; 29/459; 264/400; 264/401; 219/121.26; 219/121.73
(58) Field of Classification Search .......... 29/458, 29/459, 527.1, 527.2; 219/121.26, 121.6–121.86; 264/400, 401
See application file for complete search history.

(56) References Cited

U.S. PATENT DOCUMENTS 5,207,371 A * 5/1993 Prinz et al. .............. 228/125

(Continued)

FOREIGN PATENT DOCUMENTS

DE 42 16 502 C1 11/1993

(Continued)

OTHER PUBLICATIONS

Harris L. Marcus and David L. Bourell; Solid Freeform Manufacturing Finds New Applications; Advanced Materials & Processes; Sep. 1993; pp. 28-35.

*Primary Examiner*—Eric Compton
(74) *Attorney, Agent, or Firm*—Shinjyu Global IP Counselors, LLP

(57) ABSTRACT

The present invention relates to a method for producing a part (108, 200, 300), comprising the following steps:
  a) applying a first flat layer consisting of a support material (102, 202, 302), to a construction platform (101, 201, 301),
  b) introducing at least one recess (103, 203, 303) into the support material (102, 202, 302),
  c) filling the recess (103, 203, 303) with a construction material (104, 204, 304),
  d) applying a further layer of support material (102, 202, 302),
  e) repeating steps b) through d) until completion of the part (108, 200, 300), and
  f) removing the support material (102, 202, 302).

This method is to provide a manufacturing method and a device that combine the advantages of the layerwise construction (rapid prototyping) with the advantages of machining (e.g. high-speed cutting) and particularly permit the production of sharp-edged contours.

Furthermore, the present invention relates to a device for carrying out the method.

16 Claims, 3 Drawing Sheets

U.S. PATENT DOCUMENTS

| | | | |
|---|---|---|---|
| 5,209,878 A * | 5/1993 | Smalley et al. | 264/401 |
| 5,301,415 A | 4/1994 | Prinz | |
| 5,512,162 A * | 4/1996 | Sachs et al. | 205/91 |
| 5,695,708 A * | 12/1997 | Karp et al. | 264/401 |
| 6,084,980 A * | 7/2000 | Nguyen et al. | 382/154 |
| 6,215,093 B1 | 4/2001 | Meiners et al. | |
| 6,238,614 B1 * | 5/2001 | Yang et al. | 264/497 |

FOREIGN PATENT DOCUMENTS

| | | |
|---|---|---|
| DE | 195 28 215 A1 | 2/1997 |
| DE | 195 33 960 A1 | 3/1997 |
| DE | 196 49 865 C1 | 2/1998 |
| WO | WO 93/25336 A1 | 12/1993 |

* cited by examiner

METHOD FOR PRODUCING A PART AND DEVICE FOR CARRYING OUT THIS METHOD

BACKGROUND AND SUMMARY OF THE INVENTION

The present invention relates to a method for producing a part and to a device for carrying out said method. Particularly, the invention relates to a generative manufacturing method for producing metallic or composite parts.

In the past years many different generative methods for the direct or indirect production of mostly non-metallic parts were developed and partly commercialized.

Since in the direct manufacture of metallic parts the necessary progress has not been achieved up to now, metallic parts, particularly those with complicated geometries, are even nowadays mostly produced in indirect methods, such as precision casting or sand casting, which have already been known for a long time.

The most wide-spread method for the direct manufacture of metallic parts is milling or cutting. With the considerable speed increases provided by high-speed cutting (HSC), the attempt has already been made to combine said technology with other methods.

Due to the process chains that are often long in indirect methods (e.g. precision casting), there is a demand for methods for the direct production of metal parts. Furthermore, there is a great demand for flexible methods for the fast and direct production of metal parts in series material. Nowadays, however, this is often ruled out by problems arising in generative manufacturing methods, e.g. objectionable step effect, porous parts, small constructional space, poor surface quality, inadequate accuracy, demand for a mechanical finishing operation, stresses and distortion, restricted use of series material, only limited production of undercuts, no local use of different construction materials, inadequate properties of the materials, only limited production of functional parts.

Known direct methods for producing metallic articles are for example:

Laser generation with wire: The material is here applied by metal wires that are locally molten by means of a laser. This method belongs to the build-up welding methods. The part is here built up in lines and layers, e.g. controlled metal build up (CMB).

Laser generation with powder: The material is here applied by metal powder that is locally molten by means of a laser. The part is built up in lines and layers; e.g. laser engineering net shaping (LENS) or direct light fabrication (DLF).

Laser sintering in the power bed: Particles that are closely located side by side are molten with the help of a laser beam. Depending on the type of the powder or powder mixture there are various variants. The sintering of single-component metal powder is e.g. designated as direct metal laser sintering (DMLS) or laser power remelting (SLPR). A polymer-clad metal powder is used in the sintering of multi-component metal polymer powders. The polymer claddings are here molten to connect the particles in order to obtain a green part. In a successive process the polymer amount must be expelled and the part must be infiltrated. In the sintering of multi-component metal-metal powder a mixture is used that consists of low-melting and high-melting metal powders.

Layer-laminate method: Foils are here used as construction material that are glued or soldered; e.g. DE 197 29 770 C1, layer milling process (LMP), laminated object manufacturing (LOM).

3D printing method: Metal powder is here printed with binder. The part produced in this way must be debindered and infiltrated with metal, e.g. three-dimensional printing (3DP).

Micro-casting deposition: Layers are applied with the help of masks by thermal spraying, e.g. micro-casting deposition (MD).

Furthermore, combinations of applying and removing methods are known (cf. e.g. EP 554 033 B1). A further approach consists in segmenting and conventionally milling the parts, e.g. stratified object manufacturing (SOM) or DE 197 27 934 A1.

In (almost) all of the known methods, particularly when rotating tools are used, the tool diameter has an effect (depending on its geometry) on the geometry of the parts insofar as it is not the desired geometry, but a geometry with radii that is created. Even in methods in which the contour is produced by means of a laser, there is no sharp edge because the laser beam is most of the time rotationally symmetrical and the zone of action (e.g. of the melt area) is larger than the beam. Even in methods such as the 3D printing the drop radius has to be put up with.

It is therefore the object of the present invention to provide a method for producing a part as well as a device that combine the advantages of the layerwise construction (rapid prototyping) with the advantages of machining (e.g. high-speed cutting) and permit, in particular, the production of sharp-edged contours.

As far as the method is concerned, this object is achieved by the features of claim 1 and, as far as the device is concerned, it is achieved by the features of claim 12.

In comparison with the conventional manufacturing methods, the method of the invention according to claim 1 has a number of advantages. A kind of "layer form" is created in the processing of the support material. The layer form may be designed such that a finishing operation is perhaps not needed. This machining of the support material instead of the construction material permits an easier and faster chip removal. Tool wear is low. Smaller tool diameters can also be used. In case the construction material is difficult to machine or cannot be machined at all, for instance because of great hardness, the problem can be eliminated by way of shaping through the support material.

Thanks to the combination of support material processing and construction material processing, sharp-edged contours can be realized. Since larger milling diameters can be used, time can be saved as well.

In parts with a conventionally high chip removal rate, less volume must be machined.

The surface can preferably be leveled by milling with coarse tools. This permits a fast machining. A leveling operation is essential in order to produce a defined start surface for the next layer or to ensure the surface quality and dimensional stability if said surface or parts thereof represent the surface of the article to be produced. The surface may also be leveled by other mechanical methods or chemical or physical removal.

Thanks to a small layer thickness a dry machining with gaseous media can preferably be carried out for chip removal, cleaning and cooling. The use of liquid cooling or lubricating substances should be dispensed with, so that these need also not be removed again prior to the application of the next layer.

With the method of the invention it is possible to remove all kinds of metals, alloys, but also other materials (such as ceramics) in any desired sequence by means of a single device system and thus to produce the most different characteristics within a construction body. Thanks to the use of different materials with different characteristics, it is possible to integrate, for instance, bearing bushes of any desired geometry in a form-fit or adhesive way into the housing, and to produce porous portions e.g. for lubricant absorption, for instance by an intelligent process control, in a similar way as in sintered materials.

It may here be necessary that the surface onto which the next layer is applied is activated. This can e.g. be done by abrasive blasting, laser roughening or chemical processes within a single device system. The method of the invention and the associated device make it possible to realize constant or variable layer thicknesses, in dependence upon the geometry, the application method, the thermal characteristics, the predetermined tolerances, etc., within one part.

Moreover, it is possible to produce recesses, such as pockets or bores, also over several layers, to be able to introduce installation or insertion parts that are fixedly or loosely connected to the basic structure.

With a defined heating and cooling, characteristics, such as porosity, material structure, hardness, can also be adjusted locally in a selective way.

The method of the invention and the associated device make it possible for special applications to produce hollow bodies or double-walled bodies, or e.g. to integrate structures such as cooling channels. Movable functional parts can also be produced, e.g. through a thin gap during production or by way of material combinations that do not interconnect, or by the formation of gaps due to defined shrinkage of a material.

Both ceramics (e.g. polymer ceramics), plaster or (low-melting) metals and alloys can preferably be used as the support material. The support material can be applied by spraying or printing. Of course, other materials and known methods are also possible.

Preferred are support materials that are (water-)soluble and liquid (easily flowing). After their solidification they should be (water-)soluble again. Of advantage would also be materials that are fast-setting or solidifying. They should also be resistant to heat. Desirable would also be some kind of shrinkage that is as small as possible and thermal expansion that is as low as possible. Solubility may e.g. be accomplished by way of alkaline solutions or other media.

The support material can be applied by means of different application methods. Said application methods can be subdivided into different groups:

1. Planar application and subsequent production of the required recesses, for instance a.) planar spraying and milling of a recess (recesses), or b.) application of a layer, e.g. ceramic particles, application of a binder at the places where no recess is needed, and subsequent sucking off of unbound particles. (The contour can e.g. be finished in addition, if necessary).

2. Application of portions and subsequent finishing of the recesses needed, e.g. spraying portions and milling recess (es).

3. Application of support material in a defined way without finishing of the needed contour/recess, e.g. application of a layer in a defined way with metering systems, e.g. drop-on-demand push button.

4. Application of support material in a defined way and finishing of the needed contour/recess, e.g. application of the layer in a defined way with metering systems, such as drop-on-demand push button, and finishing by way of milling.

The recesses can be produced to have a final size (if no allowance is desired) or they may be made correspondingly larger by way of an allowance for a finishing operation. However, said final size or the measure with the allowance is independent of the geometry of the walls or of finishing work.

In all cases the contour can be applied and/or finished such that either vertical walls/steps are created or the contour (walls) is approximated to the desired contour (walls) for minimizing the step effect, or another geometry that is formed due to the application/finishing method or can be produced easily. A reworking of the layers in their height can be carried out in all variants at any time, if necessary.

The form and number of the recesses depend on the geometry of the part and can of course also include e.g. islands. If several parts are manufactured at the same time (e.g. side by side), said recesses are obtained by analogy for each part.

The part that is designed as a substrate may also be part of the article to be produced. In this case said part is not separated from the layerwise part (at least for the time being). The intermediate layers of support material can optionally be omitted in this special case.

The construction material (powder) is filled with a device into the recesses produced. To this end different application methods can be used. Some of the possible application methods shall now be described in a few words.

An example of an application method is the method of thermal spraying that has been known for a long time. Thermal spraying includes e.g. flame spraying and arc spraying, plasma spraying, high-speed flame spraying, detonation spraying and laser spraying. During thermal spraying the spraying material is molten completely or partly in a gun by a flame, plasma or arc and flung out of the gun at a high speed. The successively impinging particles form a lamella-like layer with inclusion of pores. The adhesion of the spraying particles is due to mechanical interlocking, adhesion and chemical and metallurgical interactions. Mechanical interlocking normally makes the greatest contribution to adhesion. The problem of adhesion can be solved by a melt-metallurgical connection by a subsequent melting of the new layer in itself and with the layer of construction material positioned thereunder, e.g. with the help of a laser. A problem arising in the thermal spraying at high temperatures is the oxide formation of the construction material. Since the use of inert gas (e.g. argon) as an atomizer gas is mostly not economic in the amounts needed, a certain oxide content in the construction material must be accepted.

A development of the high-speed flame spraying is cold gas spraying. This method is e.g. described in EP 484 533 B1. In cold gas spraying, powder is used as an additional material. In cold gas spraying, however, the powder particles are not molten in the gas jet because the temperature of the gas jet is most of the time below the temperature of the melting point of the powder particles.

A further application method is the group of build-up welding. Since no atomizer gas is needed here, it is possible to work under an inert gas atmosphere to avoid the formation of oxide. The energy for melting or welding can e.g. be introduced by a laser or an arc. The construction material may e.g. be supplied in the form of powder, rods or from a roll.

Especially in combination with the features of claim 8, a method is obtained that has a number of advantages over known sintering methods.

In the conventional selective laser sintering in a powder bed, the problem arises that neighboring particles are molten or partly molten in an unintended way. This is detrimental to the surface quality and dimensional stability. In the novel method there are no neighboring particles. Thus, no neighboring powder can be caked either. Furthermore, it is possible to finish the surface on the construction material. (This yields a better surface quality and a higher dimensional stability).

In the conventional selective laser sintering in the powder bed, there is further the problem that the layer thickness and the geometry of the part define the step effect. In the novel method, either the support material can be approximated to the ideal geometry of the part or the part can be approximated to the ideal geometry of the part by finishing the surface. (This leads to a minimization of the step effect, a better surface quality and a higher dimensional stability).

In the conventional selective laser sintering in the powder bed, there is the problem that the energy input must be controlled exactly to limit caking of the surrounding particles as much as possible. In the novel method there are no neighboring particles. Hence, neighboring powder cannot cake either. The process can be expedited by increasing the energy input. (This creates the possibility of increasing the speed and provides an unproblematic control of the energy input).

In the conventional selective laser sintering in the powder bed, there is also the problem that enough energy must be introduced on the one hand so as to melt the powder, and an excessive amount of energy must not be introduced on the other hand so as to avoid caking of the surrounding particles as much as possible. It is therefore often accepted that the powder is only partly molten at least to some extent. In the novel method there are no neighboring particles. Hence, neighboring powder cannot cake even in the case of an increased energy input. Due to the unproblematic melting of the particles, it is possible to produce a part with the density and characteristics as are indicated in the material specifications. (This makes it possible to produce parts having a density of 100% (no porosity) and parts with improved characteristics of the material.

In the conventional selective laser sintering in the powder bed, there is the problem that sharp edges cannot be produced in part. In the novel method, the sharp edges can already be provided in the support material—at least in part—or realized by a possible finishing operation on the construction material. (In the novel method it is possible to realize sharp edges).

In the conventional selective laser sintering in the powder bed, there is the problem that no insertion parts can be realized. (In the novel method it is possible to integrate insertion parts).

In the conventional selective laser sintering in the powder bed, there is the problem that a combination of different materials cannot be realized without the powder being contaminated with the other. (In the novel method there is the possibility of combining different materials also within one layer).

To avoid defects or voids (e.g. by oxidation) in the part, it is possible to work e.g. under a protective gas atmosphere/inert gas or in vacuum.

The powder can generally be molten by the supply of energy, e.g. by electromagnetic radiation. A laser is preferably used.

Specific scanning strategies are useful or necessary to achieve desired characteristics for part and material (e.g. overlapping of the tracks to obtain a higher density (low porosity portion)).

The manufacturing method of the invention is a combination of applying and removing production methods and comprises the following process steps:

1. Construct or digitize the part on the computer with a 3D-CAD system
2. Numerically decompose 3D-drawing/data into layers (e.g. 0.25 mm)
3. Read processed data into the machine.

Steps 1 and 3 are here identical with the preparations that are nowadays standard for a CNC manufacture or production with generative systems. Step 2 is needed for a layer-wise construction. In principle, this is also known, but in much coarser steps, from the segmented manufacture with conventional millers (e.g. DE 197 27 934 A1). When the preparatory steps are taken into account, the method shown in its entirety actually starts with the $4^{th}$ step:

4. Apply support material (e.g. inorganic or organic substances, low-melting alloy) to construction platform (e.g. by spraying). If necessary, activate the surface of the construction platform before.
5. After the support material has solidified (e.g. by setting, cooling), apply the next layer of support material.
6. Repeat step 5 so often that a sufficient height is obtained to remove the part from the platform at a later time or to insulate it thermally.
7. Level surface (e.g. by milling).
8. Apply layer of support material, if possible, in one operation (e.g. by spraying or printing).
9. After the support material has solidified (e.g. by setting, cooling), produce recess in the support material for the construction material (e.g. by milling). If undercuts in the support material are needed because of the geometry, produce vertical walls at said places. Adapt all of the other walls, if possible, to the final geometry (minimization of the step effect) or provide, if necessary, an allowance for the final geometry. If sharp edges are required on the construction material, make recess larger according to processing allowance.
10. If necessary, level and/or activate surface.
11. Apply construction material (powder) (e.g. by thermal spraying, cold gas spraying, build-up welding method).
12. If due to the application method there is e.g. no melt-metallurgical connection in itself and/or relative to the base, or the layer is porous or has cracks, melt or weld new layer in itself and optionally with the layer positioned thereunder through a source of energy (e.g. electromagnetic radiation, preferably laser beam).
13. If necessary, level surface of the layer (e.g. by milling).
14. If sharp edges are to be produced on the construction material or if an allowance was taken into account before, produce these now (e.g. by milling) or finish the same.
15. If necessary, remove the undercuts that would be created in the support material in dependence upon the geometry, now or simultaneously with step 14 on the construction material (e.g. by milling). Due to the vertical walls more material has been applied than needed. This material is now removed).
16. Repeat steps 7 to 15 until the part has reached its overall height. In case voids were produced in the support material by processing operations (e.g. undercuts, sharp edges, allowance), these voids are also filled with the application of the support material for the next layer.

17. Separate part with support material from the construction platform.

18. Remove block from the machine.

19. Remove support material to expose part (e.g. by dissolution, melting, mechanical removal).

If two or more different construction materials are to be used per layer, the second and each successive material must be introduced into the layer like the first construction material. To this end part of the already applied construction material or support material must possibly be removed again to create some space for the further construction material.

If the part is to have a higher surface quality (than would be obtained with the separation relative to the support material), or also for other reasons, the recess in the support material is made larger in accordance with a processing allowance. After the construction material has hardened, the final dimension and the final surface of the part are then produced in the area of the layer in a further step. To this end the support material must also be removed again in part.

The support material can also be applied in a defined way to minimize or avoid finishing work.

To form contours, millers or grinding tools are preferably used. Whether form millers are used, or inclinations are e.g. achieved by inclining the tool, these measures come up to the same. The predominant processing of a support material that can be machined more easily, instead of a high-quality construction material, effects faster machinability, lower tool wear and offers the possibility of using smaller tool diameters, if necessary. Sharp-edged contours can be realized by combining support material and construction material. If e.g. in this case larger miller diameters are used, this will save time in every corresponding process.

Since the chip removal for the construction material can be reduced to a minimum, high-quality construction material can be saved.

Removal processes can be carried out not only mechanically, but also with chemical or physical methods.

The facing of every layer is preferably performed with coarse tools for a faster machining operation. It is here only of importance that a defined layer thickness and a defined start surface are obtained for the next step.

For an automatic process monitoring, known sensors may be used (e.g. optical or thermal ones). They must just be of such a type that they ensure process reliability and the observation of tolerances.

The base of the system consists preferably of a conventional triaxial CNC milling machine with automatic tool changer. The machine is extended with devices for applying and optionally for processing the support material and the construction material. For instance, depending on the kind of construction material application a laser is integrated for melting the layers. All of the important additional means (except for supply means) are located within the fully encapsulated casing of the milling machine.

BRIEF DESCRIPTION OF THE DRAWINGS

The invention will now be described in more detail with reference to embodiments.

DETAILED DESCRIPTION OF THE INVENTION

Figure 1:
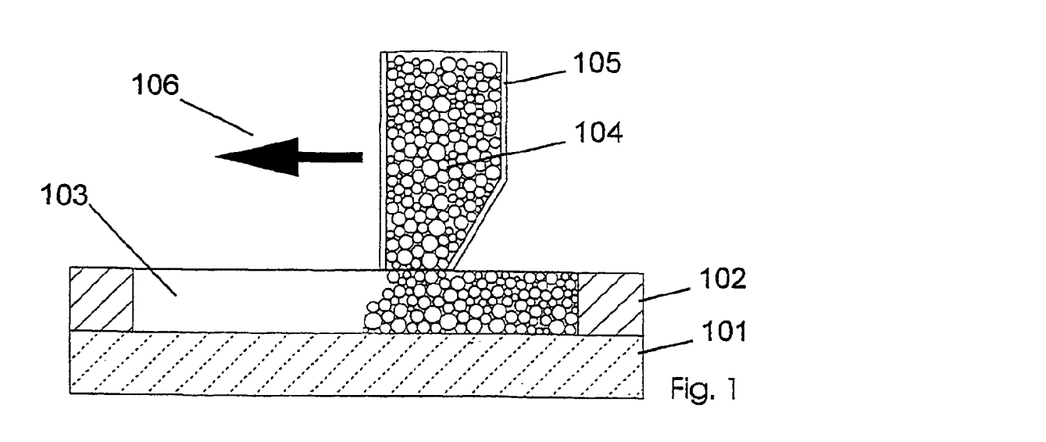
FIG. 1 is a sectional view where the construction material is just being applied in the form of powder.
Figure 2:
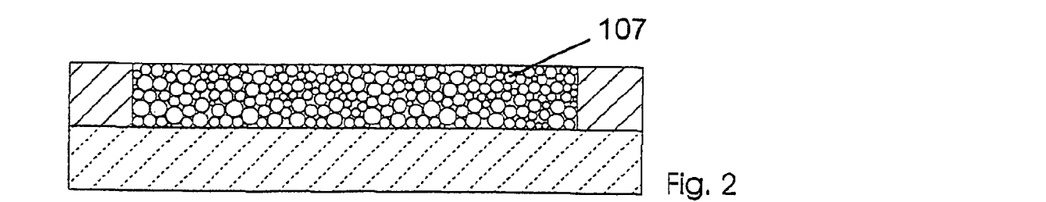
FIG. 2 is a sectional view where the construction material was applied.
Figure 3:
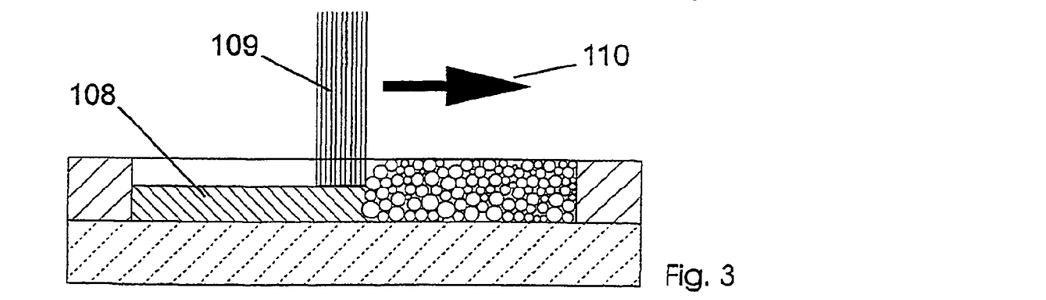
FIG. 3 is a sectional view where the construction material is just being molten with a laser.
Figure 4:
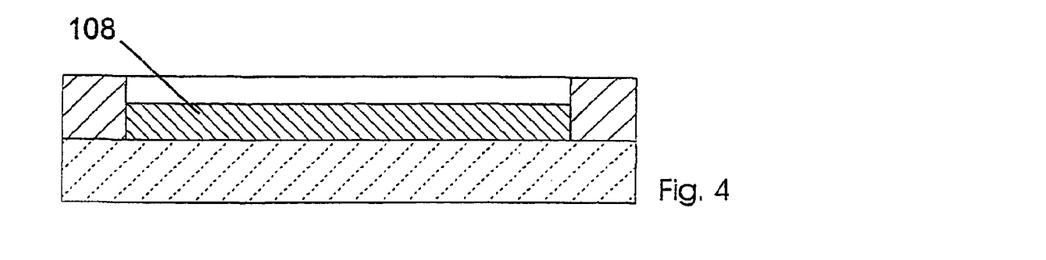
FIG. 4 is a sectional view where the construction material was molten.
Figure 5:
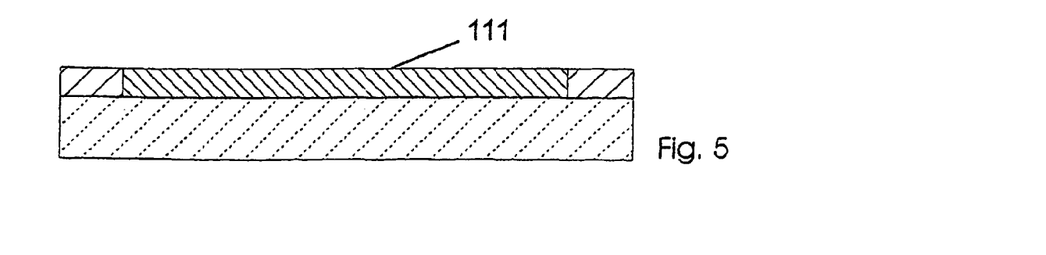
FIG. 5 is a sectional view where the uppermost layer was leveled.

FIGS. 1 to 5 depict the production of a part 108 according to a first preferred embodiment. A support material 102 is applied to a substrate 101 or a preceding layer. The support material 102 can be applied according to the contour of the desired part 108 in a defined way or in a flat form with subsequent production of the recesses 103 needed. The recess 103 may be larger than the contour of the desired part 108 if a finishing operation for the layer on the construction material 107 is to be carried out. In a further step, the recess 103 is filled with a construction material 107. To this end a supply container 105, which contains the construction material 104, is guided in the direction of arrow 106 over the recess 103 existing in the support material 102. In a further step, the construction material 107 is molten in itself and optionally molten (connected by melt metallurgy) with the layer positioned thereunder with a laser 109, which moves e.g. in the direction of arrow 110. In case an allowance was provided on part 108, said allowance can now be removed. In a further step, the whole surface 111 of the layer is leveled to obtain a defined layer height. The steps are now repeated so often that the desired part 108 is finished. Subsequently, the support material 102 is removed to expose part 108.

Figure 6:
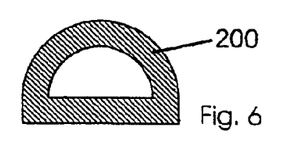
FIG. 6 is a sectional view of an article to be produced.
Figure 7:
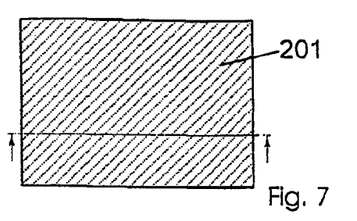
FIG. 7 is a top view on the substrate and a preceding layer.
Figure 8:
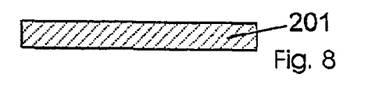
FIG. 8 is a sectional view of FIG. 7.
Figure 9:
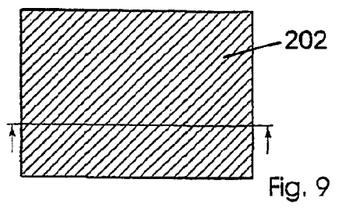
FIG. 9 is a top view on a further step of the method, wherein the support material was applied to the substrate.
Figure 10:
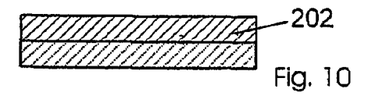
FIG. 10 is a sectional view of FIG. 9.
Figure 11:
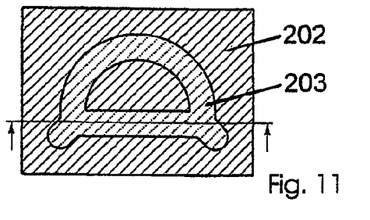
FIG. 11 is a top view on a further step of the method, wherein a recess was produced in the support material.
Figure 12:
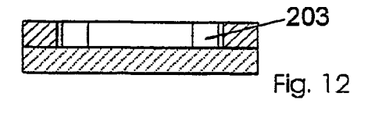
FIG. 12 is a sectional view of FIG. 11.
Figure 13:
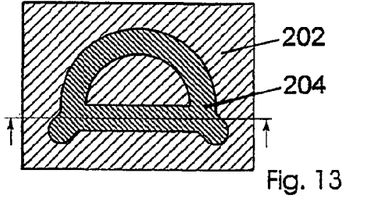
FIG. 13 is a top view on a further step of the method, wherein the recess in the support material was filled with construction material.
Figure 14:
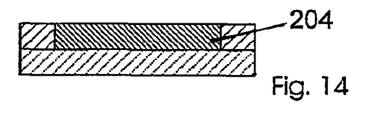
FIG. 14 is a sectional view of FIG. 13.
Figure 15:
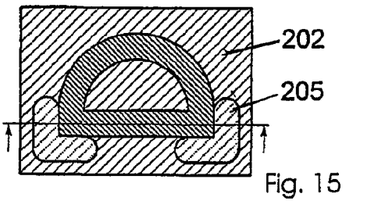
FIG. 15 is a top view on a further step of the method, wherein a sharp edge was produced on the part.
Figure 16:
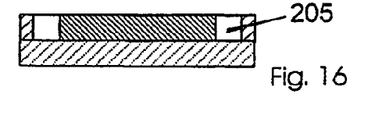
FIG. 16 is a sectional view of FIG. 15.
Figure 17:
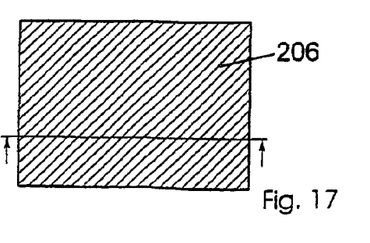
FIG. 17 is a top view on a further step of the method, wherein a new layer of support material was applied.
Figure 18:
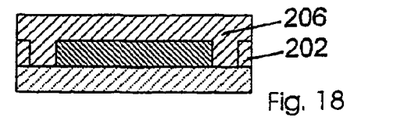
FIG. 18 is a sectional view of FIG. 17, where the new layer of support material can be recognized as a layer-overlapping ply.

In a further preferred embodiment, the production of a part 200 with a recess shall be described. In this description, the production of sharp edges or small radii shall particularly be discussed. Reference is here made to FIGS. 6 to 18. A support material 202 is applied in one operation to the whole surface on a substrate 201 or a preceding layer. In a further step, a recess 203 is produced in the layer just applied. In specific portions, said recess 203 has the contour of the desired part 200. In other portions, the final contour of the part 200 is not produced immediately, as is e.g. the case in a known method, but a larger recess is produced so that the part 200 has an allowance at specific places. Said larger recess 203 is needed when the radius of the machining tool is larger than the accepted radius on the later part 200 or when a sharp edge is needed. In a further step, the recess 203 is filled with a construction material 204. In a further step, the allowance on the construction material 204 is removed, and the whole surface of the layer is leveled to obtain a defined layer height. In the machining of the contour both a part of the construction material 203 and a part of the support material 202 are removed. This removal creates a new recess 205 in the layer. In a further step, support material 206 is applied again. During this application two layers 206 are produced at the same time because the layer 206 regards the filling of the recesses 205 (defects in the preceding layer) and the portion positioned thereabove. The steps are now repeated so often that the desired part 200 is finished. The block obtained in this way is then separated from the construction platform. Subsequently, the support material 202, 206 is removed to expose the part 200.

Figure 19:
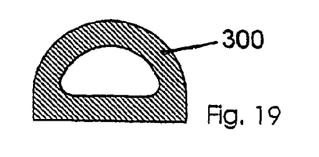
FIG. 19 is a sectional view of an article to be produced.
Figure 20:
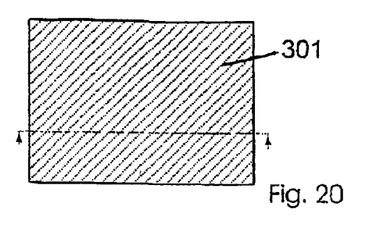
FIG. 20 is a top view on the substrate or a preceding layer.
Figure 21:
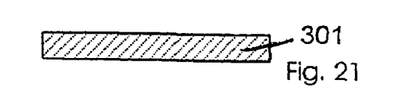
FIG. 21 is a sectional view of FIG. 20.
Figure 22:
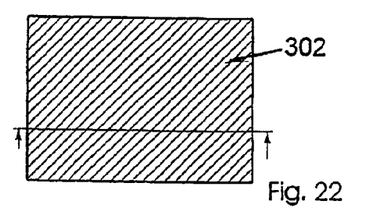
FIG. 22 is a top view on a further step of the method, wherein support material was applied to the substrate.
Figure 23:
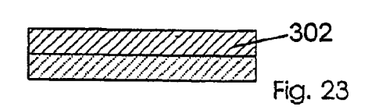
FIG. 23 is a sectional view of FIG. 22.
Figure 24:
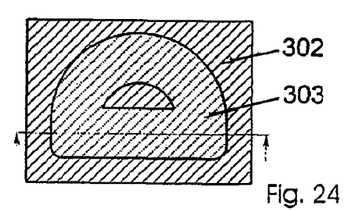
FIG. 24 is a top view on a further step of the method, wherein a recess was produced in the support material.
Figure 25:
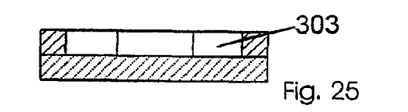
FIG. 25 is a sectional view of FIG. 24.
Figure 26:
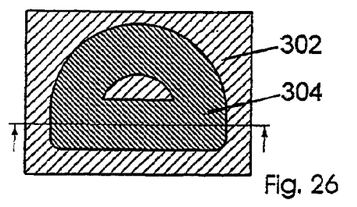
FIG. 26 is a top view on a further step of the method, wherein the recess in the support material was filled with construction material.
Figure 27:
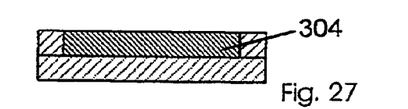
FIG. 27 is a sectional view of FIG. 26.
Figure 28:
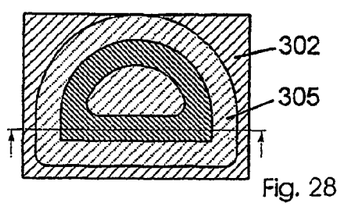
FIG. 28 is a top view on a further step of the method, wherein the allowance on the part was removed.
Figure 29:
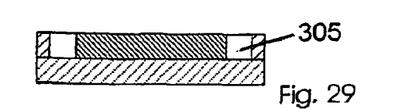
FIG. 29 is a sectional view of FIG. 28.
Figure 30:
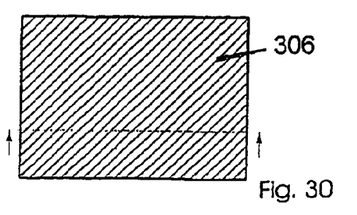
FIG. 30 is a top view on a further step of the method, wherein a new layer of support material was applied.
Figure 31:
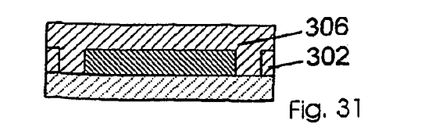
FIG. 31 is a sectional view of FIG. 30, where the new layer of support material can be recognized as a layer-overlapping ply.

In a further preferred embodiment, the production of a part 300 with a recess is described. Reference is here made to FIGS. 19 to 31. A support material 302 is applied in one operation to the whole surface on a substrate 301 or a preceding layer. In a further step, a recess 303 is formed in the layer just applied. Said recess 303 is larger than the contour of the desired part 300. Said larger recess 303 includes an allowance for finishing or smoothing the contour. The size of the allowance can be chosen freely or also in dependence, for instance, on the machining or the type of application, the accuracies needed, or the geometry. In a further step, the recess 303 is filled with a construction material 304. In a further step, the allowance on the construction material 304 is removed unless needed for a later processing, and the whole surface of the layer is leveled to obtain a defined layer height. When the contour is being processed, both a part of the construction material 304 and a part of the support material 302 are removed. This removal creates a new recess 305 in the layer. In a further step, support material 306 is applied again. During application two layers 306 are produced at the same time because the layer 306 regards the filling of the recesses 305 (defects of the preceding layer) and the area positioned thereabove. The steps are now repeated so often that the desired part 300 is finished. The block obtained in this way is then removed from the construction platform. Subsequently, the support material 302, 306 is removed to expose the part 300.

All of the measures and features of the invention contained in the description and the claims are essential features.

What is claimed is:

1. A method for producing a part, comprising the following steps:
   a) applying a first layer consisting of a support material; to a construction platform in a flat form or according to a contour of the part;
   b) introducing at least one recess into said support material, wherein said recess introduced into said support material is larger at least in portions than the contour of the desired part and thus surrounds said part with an allowance;
   c) filling said recess with a construction material;
   d) machining the part to form the desired contour and to remove said allowance such that both a part of said construction material and a part of said support material are removed and at least one new recess is thus created;
   e) applying a further layer of support material, said further layer filling both said new recess and a further layer positioned thereabove;
   f) repeating steps b) through e) until completion of said part; and
   g) removing said support material.

2. The method according to claim 1, wherein said construction platform is produced as follows:
   a) applying a first layer of support material to the whole required surface of a substrate;
   b) following the solidification of said first layer, leveling said layer and applying a further layer of support material, and
   c) repeating steps a) and b) until said construction platform has reached an adequate height to remove said part from said construction platform at a later time.

3. The method according to claim 1, wherein prior to the application of a new layer the surface of the layer positioned thereunder is leveled.

4. The method according to claim 1, wherein the surface of said construction material and/or support material is activated prior to the application of the next layer or next material.

5. The method according to claim 1, wherein for the production of undercuts in said support material, vertical walls are first produced at places of the undercuts.

6. The method according to claim 1, wherein each of the newly applied layers in itself and with the layer positioned thereunder is molten by supplying energy.

7. The method according to claim 1, wherein when two or more different construction materials are used, a separate recess is produced for each construction material.

8. The method according to claim 1, wherein the construction material applied in excess in removed on said construction material.

9. The method according to claim 1, wherein a plurality of parts are produced side by side on a construction platform.

10. A device for producing a part comprising:
    a material applying section configured and arranged to selectively apply a layer of support material to a construction platform in a flat form or according to a contour of said part; and
    a material removing section configured and arranged to form at least one recess in said part itself or in said support material that is larger than at least a portion of the contour of said part and configured to form an allowance surrounding said part, said material applying section configured and arranged to fill said recess with construction material, said material removing section configured and arranged to machine said part to form the desired contour and to remove said allowance by removing a part of said construction material and a part of said support material to form at least one new recess, and said material applying section configured and arranged to apply a further layer of support material for filling both said new recess and another layer positioned thereabove.

11. The device according to claim 10, wherein said material removing section includes at least one machining tool for said construction material and/or support material.

12. The device according to claim 10, further comprising sensors for automatic process monitoring.

13. The device according to claim 10, wherein said material removing section includes a CNC milling machine.

14. The device according to claim 10, wherein said material removing section is located within an encapsulated milling machine.

15. The device according to claim 14, wherein said material applying section includes a supply means, which is arranged outside the encapsulated milling machine.

16. The device according to claim 10, wherein said material removing section includes a laser device.

* * * * *